US007620632B2

(12) United States Patent
Andrews

(10) Patent No.: US 7,620,632 B2
(45) Date of Patent: Nov. 17, 2009

(54) METHOD AND/OR SYSTEM FOR PERFORMING TREE MATCHING

(75) Inventor: Mark Andrews, Port Townsend, WA (US)

(73) Assignee: Skyler Technology, Inc., Concord, CA (US)

( * ) Notice: Subject to any disclaimer, the term of this patent is extended or adjusted under 35 U.S.C. 154(b) by 214 days.

(21) Appl. No.: 11/006,848

(22) Filed: Dec. 7, 2004

(65) Prior Publication Data

US 2006/0004817 A1 Jan. 5, 2006

Related U.S. Application Data

(60) Provisional application No. 60/584,688, filed on Jun. 30, 2004.

(51) Int. Cl.
*G06F 7/00* (2006.01)

(52) U.S. Cl. .......................................... 707/6; 707/101

(58) Field of Classification Search .............. 707/100 S, 707/2, 3, 6, 101, 102; 715/500 S
See application file for complete search history.

(56) References Cited

U.S. PATENT DOCUMENTS

| | | | | |
|---|---|---|---|---|
| 4,156,910 | A | | 5/1979 | Barton et al. |
| 4,745,561 | A | | 5/1988 | Hirosawa et al. |
| 4,751,684 | A | | 6/1988 | Holt |
| 4,905,138 | A | | 2/1990 | Bourne |
| 4,931,928 | A | | 6/1990 | Greenfeld |
| 4,949,388 | A | | 8/1990 | Bhaskaran |
| 4,989,132 | A | | 1/1991 | Mellender et al. |
| 4,991,087 | A | | 2/1991 | Burkowski et al. |
| 5,021,943 | A | * | 6/1991 | Grimes ....................... 709/228 |
| 5,021,992 | A | | 6/1991 | Kondo |
| 5,191,522 | A | | 3/1993 | Bosco et al. |
| 5,235,701 | A | | 8/1993 | Ohler et al. |
| 5,265,245 | A | | 11/1993 | Nordstrom et al. |
| 5,295,261 | A | | 3/1994 | Simonetti |
| 5,335,345 | A | * | 8/1994 | Frieder et al. .................. 707/5 |
| 5,509,088 | A | | 4/1996 | Robson |
| 5,598,350 | A | | 1/1997 | Kawanishi et al. |
| 5,606,669 | A | | 2/1997 | Bertin et al. |
| 5,724,512 | A | | 3/1998 | Winterbottom |
| 5,724,576 | A | | 3/1998 | LeTourneau |
| 5,758,152 | A | | 5/1998 | LeTourneau |
| 5,781,906 | A | | 7/1998 | Aggarwal et al. |
| 5,787,415 | A | | 7/1998 | Jacobson et al. |
| 5,787,432 | A | | 7/1998 | LeTourneau |
| 5,796,356 | A | | 8/1998 | Okada et al. |
| 5,848,159 | A | | 12/1998 | Collins et al. |
| 5,978,790 | A | | 11/1999 | Buneman et al. |
| 5,999,926 | A | | 12/1999 | Suciu |

(Continued)

OTHER PUBLICATIONS

"Pattern Matching in Trees", Christoph M. Hoffman and Michael J. O'Donnell, Journal for the Association for Computing Machinery, vol. 29, No. 1, Jan. 1982, pp. 68-95.*

(Continued)

*Primary Examiner*—John R. Cottingham
*Assistant Examiner*—Robert Timblin
(74) *Attorney, Agent, or Firm*—Berkeley Law & Technology Group LLP

(57) ABSTRACT

Embodiments of methods, apparatuses, devices and/or systems for performing tree matching are disclosed.

60 Claims, 13 Drawing Sheets

U.S. PATENT DOCUMENTS

| | | | | |
|---|---|---|---|---|
| 6,002,879 | A | 12/1999 | Radigan et al. | |
| 6,055,537 | A | 4/2000 | LeTourneau | |
| 6,141,655 | A | 10/2000 | Johnson et al. | |
| 6,199,103 | B1 | 3/2001 | Sakuguchi | |
| 6,236,410 | B1 | 5/2001 | Politis et al. | |
| 6,289,354 | B1 | 9/2001 | Aggarwal et al. | |
| 6,292,938 | B1 * | 9/2001 | Sarkar et al. | 717/138 |
| 6,442,584 | B1 | 8/2002 | Kolli et al. | |
| 6,542,899 | B1 | 4/2003 | Saulpaugh et al. | |
| 6,550,024 | B1 | 4/2003 | Pagurek et al. | |
| 6,598,052 | B1 | 7/2003 | Saulpaugh et al. | |
| 6,606,632 | B1 | 8/2003 | Saulpaugh et al. | |
| 6,609,130 | B1 | 8/2003 | Saulpaugh et al. | |
| 6,611,844 | B1 | 8/2003 | Saulpaugh et al. | |
| 6,714,939 | B2 | 3/2004 | Saldanha et al. | |
| 6,785,673 | B1 | 8/2004 | Fernandez et al. | |
| 6,968,330 | B2 | 11/2005 | Edwards et al. | |
| 7,051,033 | B2 | 5/2006 | Agarwal et al. | |
| 7,072,904 | B2 | 7/2006 | Najork et al. | |
| 7,103,838 | B1 | 9/2006 | Krishnamurthy et al. | |
| 7,162,485 | B2 | 1/2007 | Gottlob et al. | |
| 7,191,182 | B2 | 3/2007 | Anonsen et al. | |
| 7,203,774 | B1 | 4/2007 | Zhou et al. | |
| 7,287,026 | B2 | 10/2007 | Oommen | |
| 7,313,563 | B2 | 12/2007 | Bordawekar et al. | |
| 2002/0040292 | A1 | 4/2002 | Marcu | |
| 2002/0129129 | A1 | 9/2002 | Bloch et al. | |
| 2002/0133497 | A1 | 9/2002 | Draper et al. | |
| 2002/0169563 | A1 | 11/2002 | De Carvalho Ferreira | |
| 2003/0041088 | A1 | 2/2003 | Wilson et al. | |
| 2003/0065659 | A1 | 4/2003 | Agarwal et al. | |
| 2003/0130977 | A1 | 7/2003 | Oommen | |
| 2003/0167445 | A1 * | 9/2003 | Su et al. | 715/513 |
| 2003/0195885 | A1 | 10/2003 | Emmick et al. | |
| 2003/0195890 | A1 * | 10/2003 | Oommen | 707/100 |
| 2003/0236794 | A1 | 12/2003 | Hostetter et al. | |
| 2004/0010752 | A1 | 1/2004 | Chan et al. | |
| 2004/0103105 | A1 | 5/2004 | Lindblad et al. | |
| 2004/0215642 | A1 | 10/2004 | Cameron et al. | |
| 2004/0239674 | A1 | 12/2004 | Ewald et al. | |
| 2004/0254909 | A1 * | 12/2004 | Testa | 707/1 |
| 2004/0260683 | A1 | 12/2004 | Chan et al. | |
| 2005/0027743 | A1 | 2/2005 | O'Neil et al. | |
| 2005/0060332 | A1 * | 3/2005 | Bernstein et al. | 707/100 |
| 2005/0125432 | A1 | 6/2005 | Lin et al. | |
| 2005/0165732 | A1 * | 7/2005 | Burges | 707/1 |
| 2005/0187900 | A1 | 8/2005 | LeTourneau | |
| 2005/0267908 | A1 | 12/2005 | LeTourneau | |
| 2006/0015538 | A1 | 1/2006 | LeTourneau | |
| 2006/0095442 | A1 | 5/2006 | LeTourneau | |
| 2006/0095455 | A1 | 5/2006 | LeTourneau | |
| 2006/0123029 | A1 | 6/2006 | LeTourneau | |
| 2006/0129582 | A1 | 6/2006 | Schiffmann | |
| 2006/0259533 | A1 | 11/2006 | LeTourneau | |
| 2006/0271573 | A1 | 11/2006 | LeTourneau | |
| 2007/0198538 | A1 | 8/2007 | Palacios | |

OTHER PUBLICATIONS

Dubiner, M.,Galil, Z., and Magen, E. "Faster Tree Pattern Matching." Journal of the Association for Computing Machinery. vol. 41, No. 2. Mar. 1994. pp. 205-213.*

Ramesh, R. and Ramakrishnan, I. V. "Nonlinear Pattern Matching in Trees." Journal of the Association for Computing Machinery, vol. 39, No. 2 Apr. 1992. pp. 295-316.*

"Core Technology Benchmarks A White Paper", Jul. 2002, downloaded from the internet Mar. 2, 2004.

"Origin Data, Inc. White Paper", pp. 1-13.

"The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.

"The Associative Model of Data White Paper", Lazy Software, 2000.

Apostol, "A Centennial History of the Prime Number Theorem", Engineering and Science, No. 4, 1996.

Cano et al., "Lazy Evaluation in Penniless Propagation over Join Trees", Networks, vol. 39(4), 175-185, 2002.

Cooper et al., "*Oh! Pascal!*", 1982, pp. 295-327.

Er, M.C., "Enumerating Ordered Trees Lexicographically", Computation Journal, vol. 28, Issue 5, pp. 538-542, 1985.

Kharbutli et al., "Using Prime Numbers for Cache Indexing to Eliminate Conflict Misses", 24 pages.

Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.

Letourneau, "The Elementary Theory of Object Oriented Arithmetic", pp. 1-9, Apr. 1990.

Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.

Sechrest et al., "Blending Hierarchical and Attribute-Based File Naming", Distributed Computing System, 1992., Proceedings of the 12th International Conference on Jun. 9-12, 1992, pp. 572-580.

Shanmugasundaram et al., "Querying SML Views of Relational Data", Proceedings of the 27th VLDB Conference, Roma, Italy, 2001.

Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) 2000.

Smorynski, Craig, "Logical Number Theory I: An Introduction", Springer-Verlag, 1991, pp, 14-23, and 305.

Somani et al., "Phased-Mission System Analysis Using Boolean Algebraic Methods", May 1994, ACM Press, vol. 22, Issue 1.

Stanat, D.F., and McAllister, D.F., "Discrete Mathematics in Computer Science", Prentice-Hall, 1977, Section 3.2, Trees, p. 131-145.

Valiente, "Algorithms on Trees and Graphs", pp. 151-251, Springer 2002.

Valiente, Gabriel, Chapter 4, "Tree Isomorphism," of Algorithms on Trees and Graphs, published by Springer, 2002.

Zaks, S., "Lexicographic Generation of Ordered Trees", The Journal of Theoretical Computer Science, vol. 10(1), pp. 63-82, 1980.

Office action: Restriction Requirement in co-pending U.S. Appl. No. 11/005,859, dated Dec. 12, 2007.

Response to Restriction Requirement in co-pending U.S. Appl. No. 11/005,859, dated Jan. 14, 2008.

Non-Final OA in co-pending U.S. Appl. No. 11/005,859, dated Mar. 21, 2008.

Preliminary Amendment in co-pending U.S. Appl. No. 11/007,139, dated Apr. 28, 2005.

Non-Final OA issued in co-pending pending U.S. Appl. No. 11/007,139 dated May 14, 2007.

Response to Non-Final OA in co-pending U.S. Appl. No. 11/007,139 dated Oct. 15, 2007.

Supplemental Amendment in co-pending U.S. Appl. No. 11/007,139 dated Oct. 17, 2007.

Non-Final OA issued in co-pending U.S. Appl. No. 11/007,139 dated Jan. 2, 2008.

Response to Non-Final OA in co-pending U.S. Appl. No. 11/007,139 dated Apr. 2, 2008.

Office action: Restriction Requirement in co-pending U.S. Appl. No. 11/006,320 dated Mar. 26, 2007.

Response to Restriction Requirement in co-pending U.S. Appl. No. 11/006,320, dated Apr. 27, 2007.

Notice of Non-Compliant Amendment in co-pending U.S. Appl. No. 11/006,320, dated Jul. 6, 2007.

Response to Notice of Non-Compliant Amendment in co-pending U.S. Appl. No. 11/006,320, dated Jul. 25, 2007.

Non-Final OA issued in co-pending U.S. Appl. No. 11/006,320 dated Oct. 1, 2007.

Response to Non-Final OA in co-pending U.S. Appl. No. 11/006,320 dated Jan. 29, 2008.
Notice of Non-Compliant Amendment in co-pending U.S. Appl. No. 11/006,320 dated Apr. 8, 2008.
Non-Final OA issued in co-pending U.S. Appl. No. 11/006,841, dated Apr. 06, 2007.
Response to Non-Final OA in co-pending U.S. Appl. No. 11/006,841, dated Sep. 06, 2007.
Office Action: Restriction Requirement in co-pending U.S. Appl. No. 11/006,841, dated Nov. 27, 2007.
Response to Restriction Requirement in co-pending U.S. Appl. No. 11/006,841, dated Dec. 27, 2007.
Office Action: Restriction Requirement in co-pending U.S. Appl. No. 11/006,841, dated Mar. 17, 2008.
Preliminary Amendment in co-pending U.S. Appl. No. 11/006,440 dated Apr. 28, 2005.
Preliminary Amendment and Substitute Specification in co-pending U.S. Appl. No. 11/006,440 dated Oct. 5, 2006.
Office Action: Restriction Requirement in co-pending U.S. Appl. No. 11/006,440 dated Mar. 29, 2007.
Response to Restriction Requirement in co-pending U.S. Appl. No. 11/006,440 dated Apr. 30, 2007.
Non-Final OA issued in co-pending U.S. Appl. No. 11/006,440 dated Jun. 21, 2007.
Response to Non-Final OA in co-pending U.S. Appl. No. 11/006,440 dated Nov. 20, 2007.
Final OA issued in co-pending U.S. Appl. No. 11/006,440 dated Feb. 6, 2008.
Response to Final OA in co-pending U.S. Appl. No. 11/006,440 dated Apr. 7, 2008.
Preliminary Amendment in co-pending U.S. Appl. No. 11/006,446, dated Apr. 28, 2005.
Office Action: Restriction Requirement in co-pending U.S. Appl. No. 11/006,446, dated Apr. 4, 2007.
Response to Restriction Requirement in co-pending U.S. Appl. No. 11/006,446, dated May 3, 2007.
Non-Final OA issued in co-pending U.S. Appl. No. 11/006,446, dated Jul. 26, 2007.
Response to Non-Final OA in co-pending U.S. Appl. No. 11/006,446, dated Nov. 26, 2007.
Non-Final OA issued in co-pending U.S. Appl. No. 11/006,446, dated Feb. 20, 2008.
Office Action: Restriction Requirement in co-pending U.S. Appl. No. 11/006,842, dated Jan. 23, 2008.
Response to Restriction Requirement in co-pending U.S. Appl. No. 11/006,842, dated Feb. 25, 2008.
Office Action: Restriction Requirement in co-pending U.S. Appl. No. 11/412,417, dated Apr. 1, 2008.
Co-pending Patent U.S. Appl. No. 11/319,758, filed Dec. 2005.
Co-pending Patent U.S. Appl. No. 11/320,538, filed Dec. 2005.
Co-pending Patent U.S. Appl. No. 11/480,094, filed Jun. 2006.
Non-Final OA issued in co-pending U.S. Appl. No. 11/385,257, dated Apr. 29, 2008.
Response to Notice of Non-Compliant Amendment in co-pending U.S. Appl. No. 11/006,320 dated May 5, 2008.
Advisory Action issued in co-pending U.S. Appl. No. 11/006,440 dated May 9, 2008.
Preliminary Amendment in co-pending U.S. Appl. No. 11/005,859, dated May 2, 2005.
Preliminary Amendment in co-pending U.S. Appl. No. 11/006,320 dated May 9, 2005.
Response filed Jul. 21, 2008 in co-pending U.S. Appl. No. 11/005,859, 86 pages.
Final Office Action mailed Oct. 30, 2008 in co-pending U.S. Appl. No. 11/005,859, 14 pages.
Response filed Dec. 30, 2008 in co-pending U.S. Appl. No. 11/005,859, 82 pages.
Advisory Action mailed Jan. 13, 2009 in co-pending U.S. Appl. No. 11/005,859, 3 pages.
RCE and Amendment filed Apr. 30, 2009 in co-pending U.S. Appl. No. 11/005,859, 86 pages.
Final Office action mailed Aug. 15, 2008 in co-pending U.S. Appl. No. 11/007,139, 22 pages.
Response filed Oct. 15, 2008 in co-pending U.S. Appl. No. 11/007,139, 23 pages.
Advisory action mailed Oct. 22, 2008 in co-pending U.S. Appl. No. 11/007,139, 26 pages.
RCE and Amendment filed Nov. 14, 2008 in co-pending U.S. Appl. No. 11/007,139, 27 pages.
Office action mailed Dec. 8, 2008 in co-pending U.S. Appl. No. 11/007,139, 17 pages.
Amendment filed May 8, 2009 in co-pending U.S. Appl. No. 11/007,139, 26 pages.
Non-Final OA mailed Aug. 15, 2008 in co-pending U.S. Appl. No. 11/006,320, 19 pages.
Response to Non-Final OA filed Nov. 14, 2008 in co-pending U.S. Appl. No. 11/006,320, 37 pages.
Notice of Non-Compliant Amendment mailed Jan. 27, 2009 in co-pending U.S. Appl. No. 11/006,320, 2 pages.
Amendment filed Apr. 27, 2009 in co-pending U.S. Appl. No. 11/006,320, 39 pages.
Response to Restriction Requirement filed Jul. 17, 2008 in co-pending U.S. Appl. No. 11/006,841, 33 pages.
Final Office Action, mailed Oct. 29, 2008 in co-pending U.S. Appl. No. 11/006,841, 54 pages.
Response filed Dec. 29, 2008 in co-pending U.S. Appl. No. 11/006,841, 45 pages.
Advisory Action mailed Jan. 6, 2009 in co-pending U.S. Appl. No. 11/006,841, 3 pages.
RCE and Amendment filed Apr. 23, 2009 in co-pending U.S. Appl. No. 11/006,841, 48 pages.
Notice of Appeal filed Aug. 4, 2008 in co-pending U.S. Appl. No. 11/006,440, 1 page.
RCE and Amendment filed Nov. 4, 2008 in co-pending U.S. Appl. No. 11/006,440, 39 pages.
Final Office action mailed Jan. 23, 2009 in co-pending U.S. Appl. No. 11/006,440, 22 pages.
Amendment After Final filed Apr. 23, 2009 in co-pending U.S. Appl. No. 11/006,440, 34 pages.
Response filed Jul. 21, 2008 in co-pending U.S. Appl. No. 11/006,446, 29 pages.
Final Office action mailed Oct. 28, 2008 in co-pending U.S. Appl. No. 11/006,446, 40 pages.
Response filed Dec. 29, 2008 in co-pending U.S. Appl. No. 11/006,446, 30 pages.
Advisory action mailed Jan. 7, 2009 in co-pending U.S. Appl. No. 11/006,446, 3 pages.
RCE and Amendment filed Apr. 28, 2009 in co-pending U.S. Appl. No. 11/006,446, 33 pages.
Amendment filed Jul. 29, 2008 in co-pending U.S. Appl. No. 11/385,257, 26 pages.
Final Office action mailed Dec. 9, 2008 in co-pending U.S. Appl. No. 11/385,257, 35 pages.
RCE and Amendment filed May 11, 2009 in co-pending U.S. Appl. No. 11/385,257, 33 pages.
Supplemental Response filed May 26, 2009 in co-pending U.S. Appl. No. 11/385,257, 3 pages.
Notice of Non-Compliant Amendment mailed Jun. 1, 2009 in co-pending U.S. Appl. No. 11/385,257, 3 pages.
Non-final Office action mailed Nov. 12, 2008 in co-pending U.S. Appl. No. 11/319,758, 30 pages.
Amendment filed May 12, 2009 in co-pending U.S. Appl. No. 11/319,758, 35 pages.
Office action: Restriction Requirement mailed May 13, 2008 in co-pending U.S. Appl. No. 11/006,842, 5 pages.
Response to Restriction Requirement filed Aug. 13, 2008 in co-pending U.S. Appl. No. 11/006,842, 24 pages.
Office action mailed Nov. 3, 2008 in co-pending U.S. Appl. No. 11/006,842, 21 pages.
Response filed May 4, 2009 in co-pending U.S. Appl. No. 11/006,842, 35 pages.
Office action mailed Apr. 1, 2009 in co-pending U.S. Appl. No. 11/320,538, 18 pages.
Office action mailed May 27, 2009 in co-pending U.S. Appl. No. 11/361,500, 24 pages.

Amendment filed Aug. 1, 2008 in co-pending U.S. Appl. No. 11/412,417, 27 pages.
Final Office action mailed Nov. 13, 2008 in co-pending U.S. Appl. No. 11/412,417, 34 pages.
Amendment filed May 12, 2009 in co-pending U.S. Appl. No. 11/412,417, 31 pages.
Notice to File Corrected Application Papers mailed Aug. 2, 2006 in co-pending U.S. Appl. No. 11/480,094, 2 pages.
Response filed Nov. 2, 2006 in co-pending U.S. Appl. No. 11/480,094, 28 pages.
Office action mailed Nov. 7, 2008 in co-pending U.S. Appl. No. 11/480,094, 19 pages.
Amendment filed May 7, 2009 in co-pending U.S. Appl. No. 11/480,094, 39 pages.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
Leinonen, "Automation of Document Structure Transformation", Auditorium, Microteknia Building, University of Kuopio, Nov. 23, 2004, 68 pages.
Lerman et al., "Learning the Common Structure of Data", American Association for Artificial Intelligence, AAAI-00 Proceedings, www.aaai.org, Apr. 13, 2000, 6 pages.
Final Office action mailed Jul. 8, 2009 in co-pending U.S. Appl. No. 11/005,859, 8 pages.
Final Office action mailed Aug. 4, 2009 in co-pending U.S. Appl. No. 11/007,139, 18 pages.
Final Office action mailed Jul. 29, 2009 in co-pending U.S. Appl. No. 11/006,320, 7 pages.
Response filed Jun. 26, 2009 in co-pending U.S. Appl. No. 11/006,841, 34 pages.
Notice of Allowance mailed Jun. 29, 2009 in co-pending U.S. Appl. No. 11/006,841, 40 pages.
Supplemental Amendment filed Jul. 17, 2009 in co-pending U.S. Appl. No. 11/006,440, 29 pages.
Notice of Allowance mailed Jul. 31, 2009 in co-pending U.S. Appl. No. 11/006,440, 15 pages.
Examiner's Amendment and Reasons for Allowance mailed Sep. 3, 2009 in co-pending U.S. Appl. No. 11/006,440, 9 pages.
Office action mailed Jul. 7, 2009 in co-pending U.S. Appl. No. 11/006,446, 32 pages.
Response filed Jun. 30, 2009 in co-pending U.S. Appl. No. 11/385,257, 31 pages.
Final Office action mailed Aug. 30, 2009 in co-pending U.S. Appl. No. 11/319,758, 35 pages.
Supplemental Response filed Jul. 17, 2009 in co-pending U.S. Appl. No. 11/006,842, 23 pages.
Notice of Allowance mailed Jul. 27, 2009 in co-pending U.S. Appl. No. 11/006,842, 13 pages.
Response filed Jul. 1, 2009 in co-pending U.S. Appl. No. 11/320,538, 26 pages.
Response filed Aug. 27, 2009 in co-pending U.S. Appl. No. 11/361,500, 36 pages.
Office action mailed Jun. 30, 2009 in co-pending U.S. Appl. No. 11/412,417, 34 pages.
Final Office action mailed Jul. 28, 2009 in co-pending U.S. Appl. No. 11/480,094, 12 pages.
IEEE Explore Digital Library Search Result conducted by Examiner on Jul. 18, 2009, 1 page.
ACM Portal Search Results (Kleene and prime and enumeration and operation and natural and numerals and sequences and "enumeration operation") conducted by Examiner on Jul. 18, 2009, 6 pages.
ACM Portal Search Results (Kleene and prime and enumeration and operation and natural and numerals and sequences and enumeration and operation) conducted by Examiner on Jul. 18, 2009, 1 page.
Google Search (Kleene prime enumeration operation) conducted by Examiner on Jul. 18, 2009, 2 pages.
Google search (Kleene prime enumeration operation natural numerals sequences "Kleene prime") conducted by Examiner on Jul. 18, 2009, 2 pages.
Google Search (Kleene prime enumeration operation natural numerals sequences "enumeration operation") conducted by Examiner on Jul. 18, 2009, 2 pages.

* cited by examiner

100

200

300

400

500

600

700

805

810

800

1000

1000

1100

1200

METHOD AND/OR SYSTEM FOR PERFORMING TREE MATCHING

This disclosure claims priority pursuant to 35 USC § 119 (e) from U.S. Provisional Patent Application No. 60/584,688, filed on Jun. 30, 2004, by Andrews, titled, "METHOD AND/OR SYSTEM FOR PERFORMING TREE MATCHING," assigned to the assignee of claimed subject matter.

BACKGROUND

This disclosure is related to tree matching.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database, and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

Figure 1:
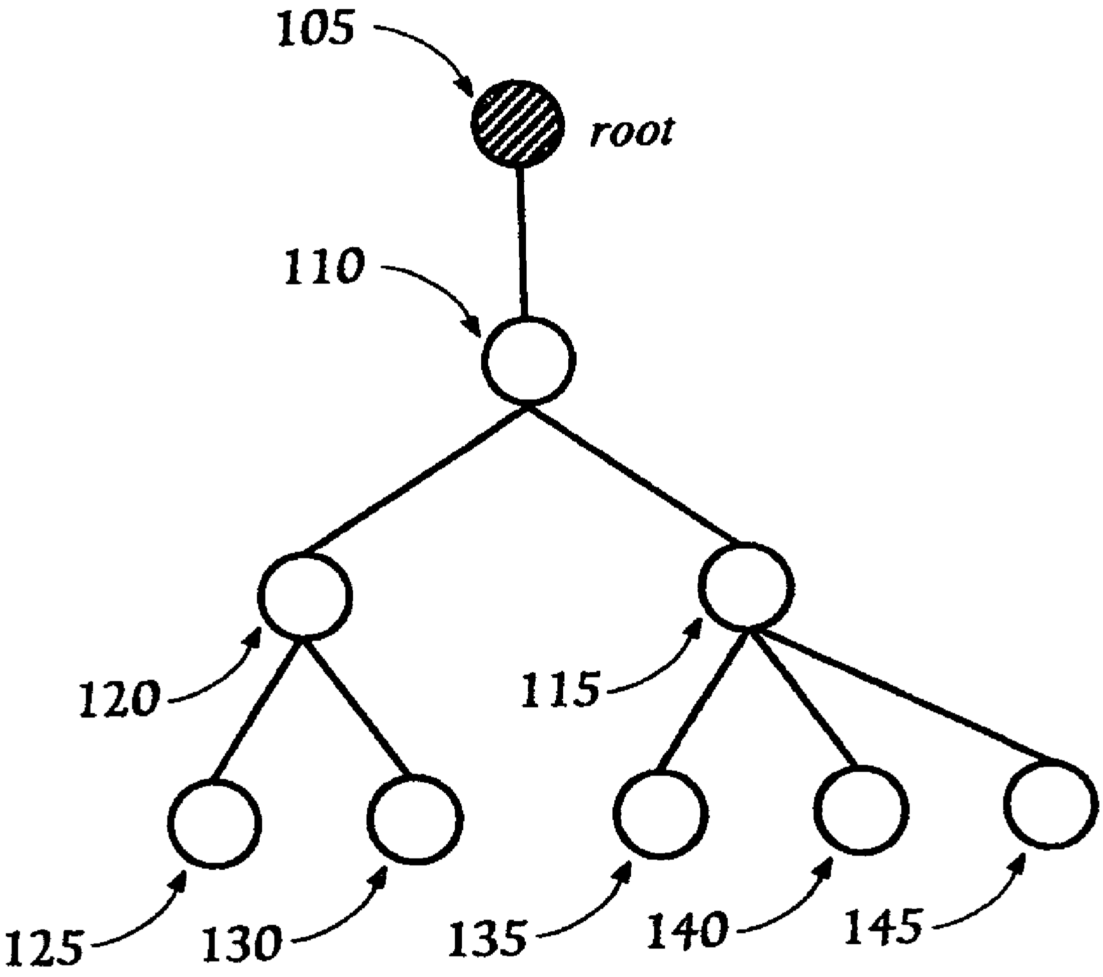
FIG. 1 is a schematic diagram of one embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject-matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

As previously discussed, in a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected, acyclic graph. Likewise, such trees may be either ordered or unordered. Here, ordered refers to the notion that there is an ordering or precedence among nodes attached to a common node corresponding to the order of the attached nodes shown in a graphical illustration. An ordered tree is illustrated here, for example, in FIG. 1 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data and/or values may be limited to binary data, that is, in this example, either a binary one or a binary zero. Here, such an embodiment may be referred to as a binary edge labeled tree (BELT), as shall be discussed in more detail hereinafter. In this embodiment, an ordered binary edge labeled tree is shown. Here, ordered refers to the notion that there is an ordering or precedence among nodes attached to a common node corresponding to the order of the attached nodes shown in a graphical illustration.

Figure 2:
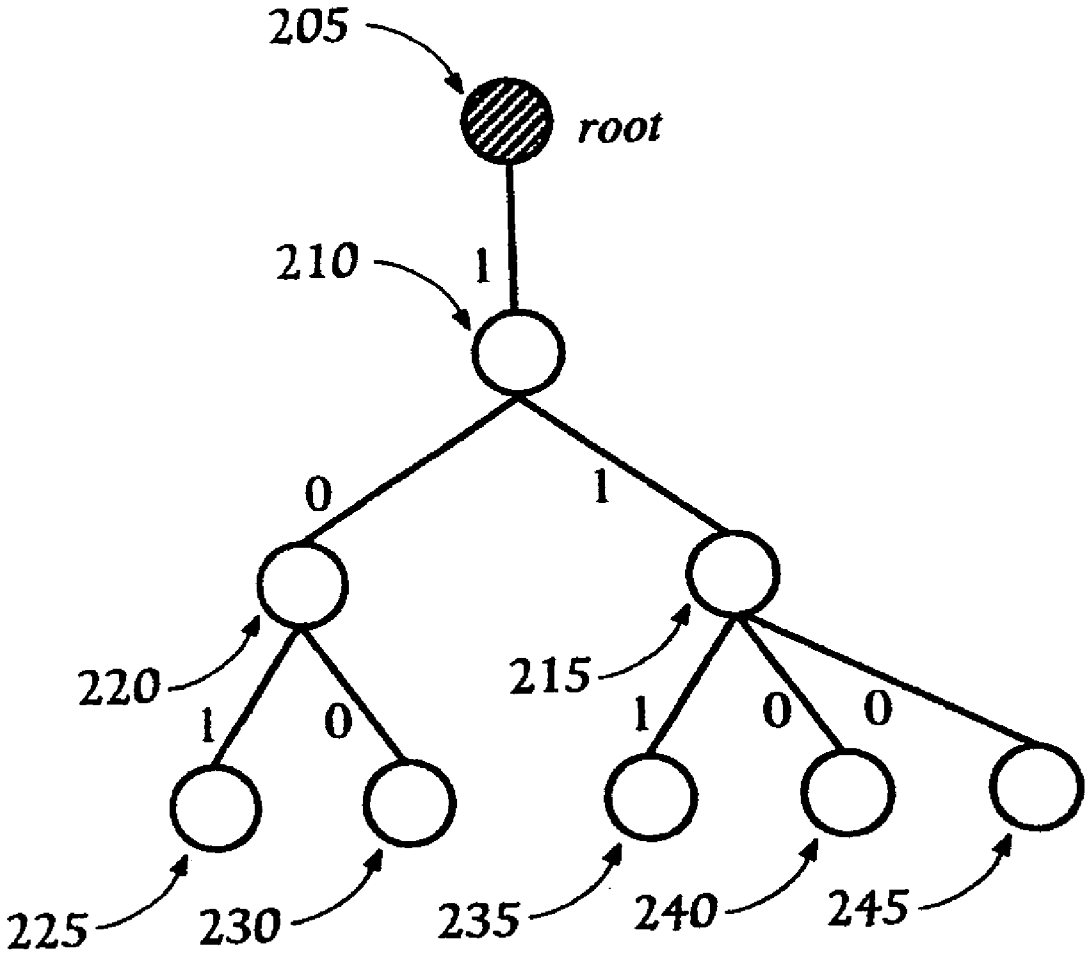
FIG. 2 is a schematic diagram illustrating one embodiment of an ordered binary edge labeled tree.
Figure 3:
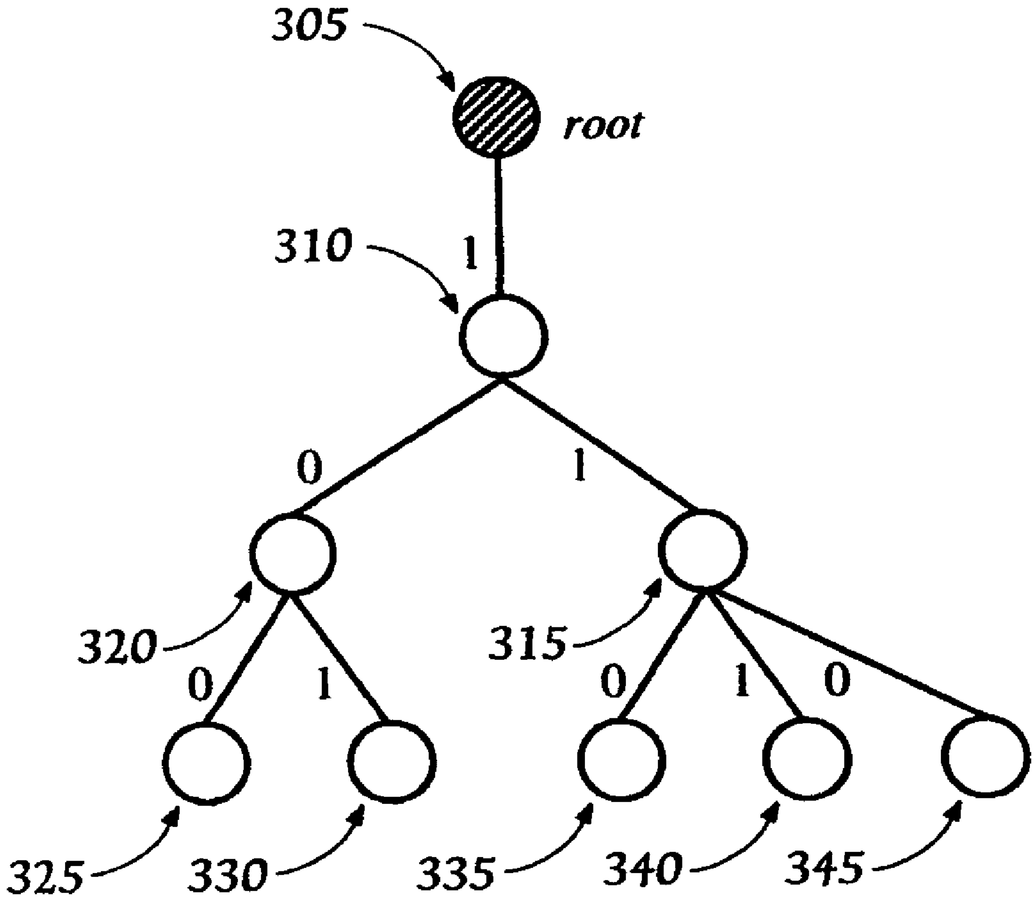
FIG. 3 is a schematic diagram illustrating another embodiment of an ordered binary edge labeled tree.

One example of an ordered BELT is illustrated by embodiment 200 of FIG. 2. Thus, as illustrated, the edges of the BELT shown in FIG. 2, including nodes 205, 210, 215, 220, 225, 230, 235, 240 and 245, are labeled with either a binary zero or binary one. FIG. 3 illustrates another embodiment 300 of a different ordered binary edge labeled tree, including nodes 305, 310, 315, 320, 325, 330, 335, 340 and 345. It is noted that this tree is similar or isomorphic in arrangement or structure to the embodiment of FIG. 2, as shall be explained in more detail hereinafter.

Figure 4:
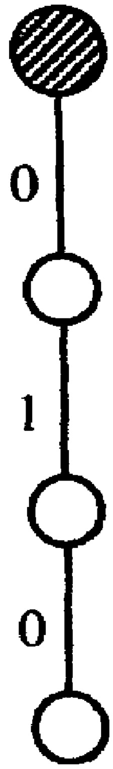
FIG. 4 is a schematic diagram illustrating an embodiment of a binary edge labeled string.

A subset of BELTs may be referred to, in this context, as binary edge labeled strings (BELSs). One embodiment, 400, is illustrated in FIG. 4. Thus, as illustrated by embodiment 400, this particular binary edge labeled string comprises four nodes and three edges, where the edges are labeled, respectively, binary zero, binary one and binary zero. Thus, a binary edge labeled string comprises a binary edge labeled tree in which each node has no more than two edges. To reiterate, in this context, a string comprises a binary edge labeled string and a tree comprises a binary edge labeled tree if each edge of the string or tree respectively stores a single bit. Likewise, in this context, two nodes are employed to support an edge holding a single piece of binary data. At this point, it is worth noting that strings and trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

As may be apparent by a comparison of FIG. 4 with, for example, FIG. 2 or FIG. 3, typically, a binary edge labeled tree has the ability to be richer and convey more data and/or more information than a binary edge labeled string. This may be observed, by a comparison of FIG. 4 with, for example, FIG. 2 or FIG. 3. Of course, depending on the particular tree and the particular string, there may be contrary examples, such as where the string is particularly large and the tree is particularly small. The aspect of BELTs to be richer in information may be one potential motivation to employ BELTs over BELSs, for example.

Despite the prior observation, as shall be described in more detail hereinafter, an association may be made between any particular binary edge labeled string and a binary edge labeled tree or vice-versa, that is, between any particular binary edge labeled tree and a binary edge labeled string. See, for example, U.S. provisional patent application Ser. No. 60/543,371, filed on Feb. 9, 2004, titled "Manipulating Sets of Hierarchical Data," assigned to the assignee of the presently claimed subject matter. In particular, an association may be constructed between binary edge labeled trees and binary edge labeled strings by enumerating in a consecutive order binary edge labeled strings and binary edge labeled trees, respectively, and associating the respectively enumerated strings and trees with natural numerals. Of course, many embodiments of associations between trees, whether or not BELTs, and strings, whether or not BELS, or between trees, whether or not BELTs, and natural numerals are possible. It is intended that the claimed subject matter include such embodiments, although the claimed subject matter is not limited in scope to the aforementioned provisional patent application or to employing any of the techniques described in the aforementioned provisional patent application.

Binary edge labeled trees may also be listed or enumerated. See, for example, previously cited U.S. provisional patent application Ser. No. 60/543,371. This is illustrated, here, for example, in FIG. 5. It is noted that this particular figure also includes the associated natural numerals. The association 500 of such numerals for this particular embodiment should be clear based at least in part on previously cited U.S. provisional patent application Ser. No. 60/543,371. However, it is, of course, again noted that the claimed subject matter is not limited in scope to employing the approach or approaches described in U.S. provisional patent application Ser. No. 60/543,371. U.S. provisional patent application Ser. No. 60/543,371 is provided simply as an example of listing or enumerating unordered BELTs. Thus, it is noted further that the BELTs described are unordered.

Figure 5:
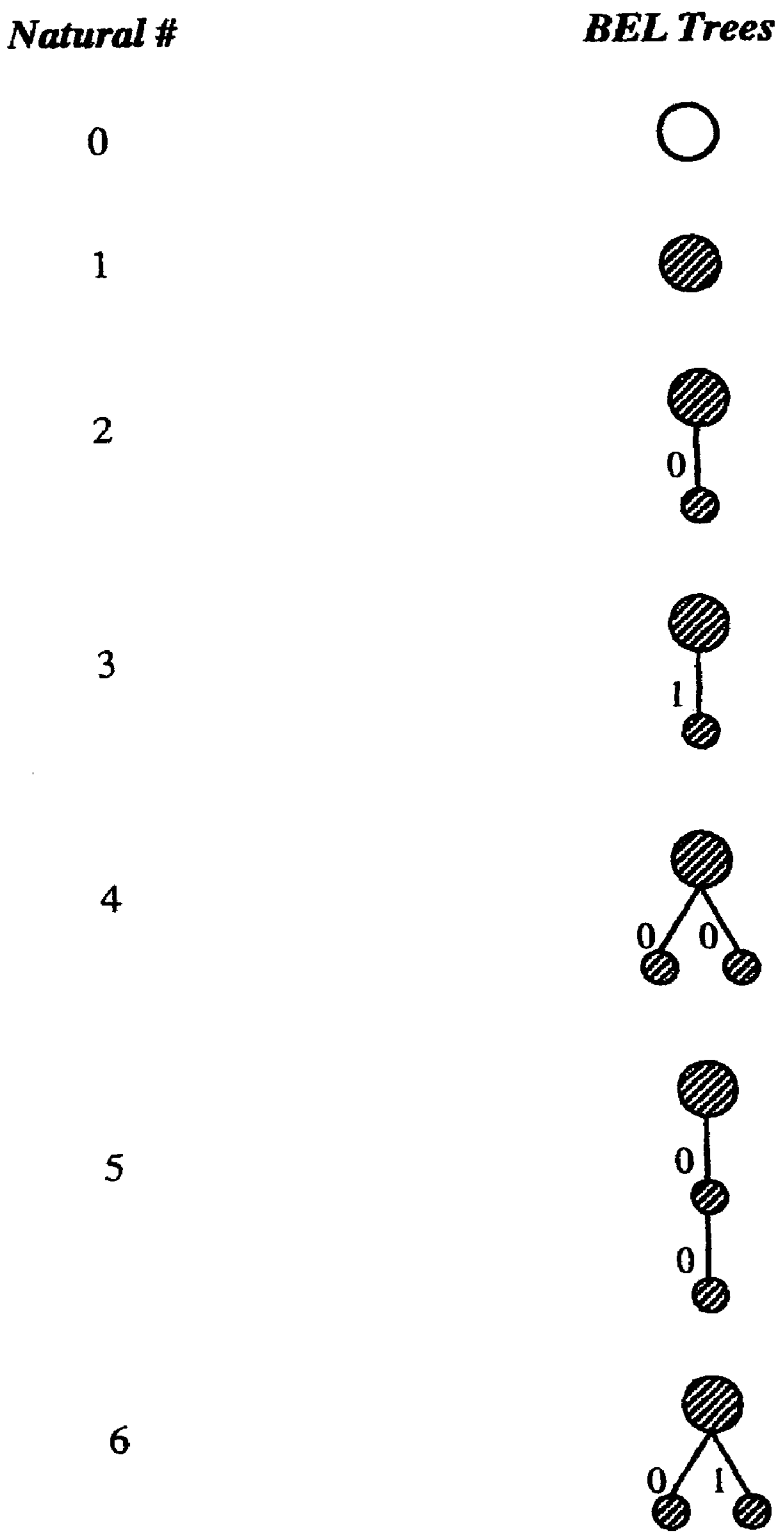
FIG. 5 is a table illustrating an embodiment of an association between natural numerals and unordered BELTs.

However, for this particular embodiment, although the claimed subject matter is not limited in scope in this respect, a method of enumerating a set of ordered trees may begin with enumeration of an empty binary edge labeled tree and a one node binary edge labeled tree. Thus, the empty tree is associated with the natural numeral zero and has a symbolic representation as illustrated in FIG. 5 (circle). Likewise, the one node tree, which holds no data, is associated with the natural numeral-one and has a graphical representation of a single node. For higher positive natural numbers, ordered trees may be generated by a process described, for example, in "The Lexicographic Generation of Ordered Trees," by S. Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985. This may be illustrated, for example in FIG. 5, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

Figure 9:
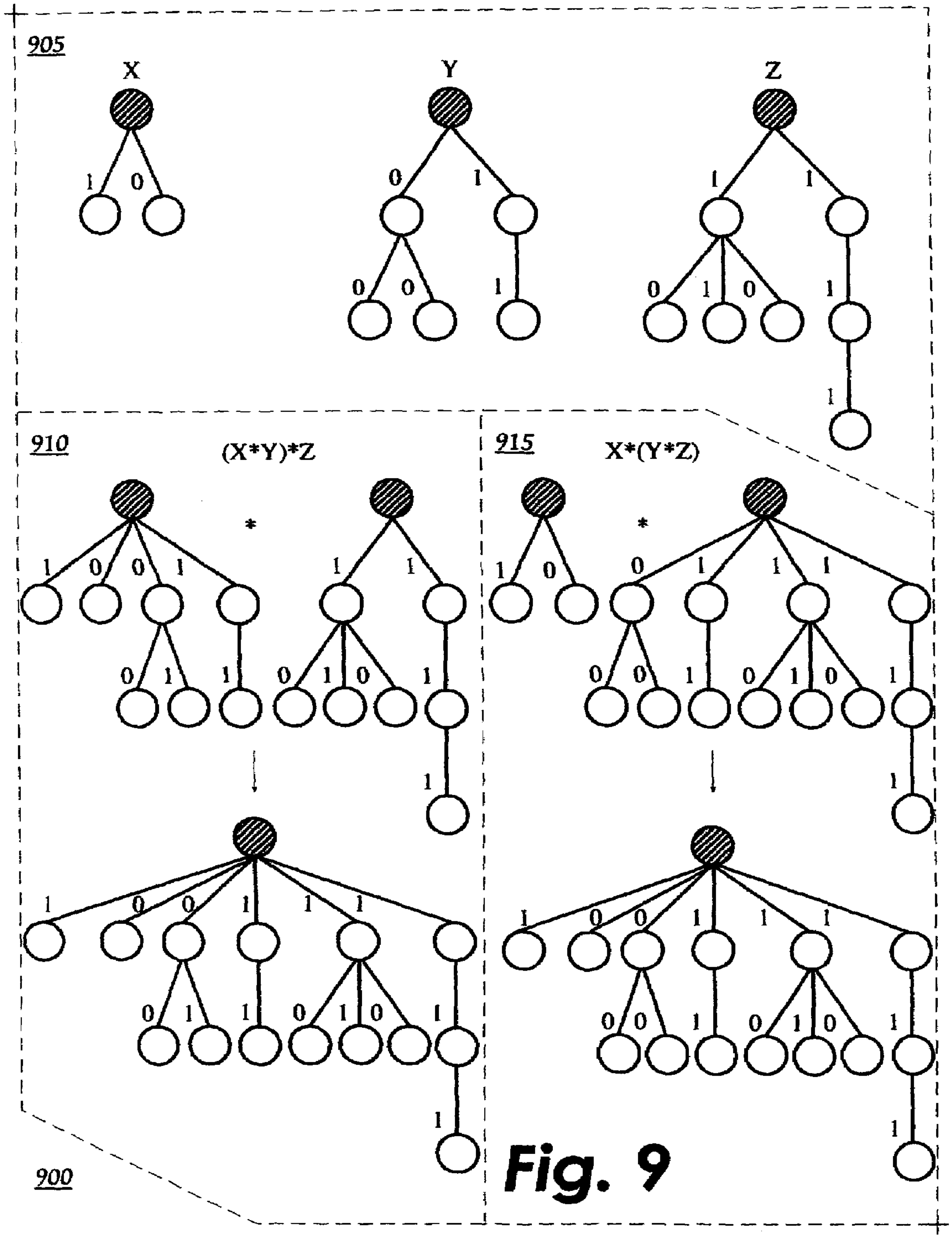
FIG. 9 is a schematic diagram illustrating examples of potential embodiments of query and target trees.

In this context, adding a root node and an edge and labeling it binary zero is referred to as a "zero-push" operation and adding a root node and an edge and labeling it binary one is referred to as a "one-push" operation. Thus, referring again to FIG. 5, the one-push of the root tree is the tree at position three. This follows from FIG. 9 of previously referenced U.S. provisional patent application Ser. No. 60/543,371, since P(2*1)=P(2)=3. Likewise, the tree at position five is the zero-push of the tree at position 2. Again, this follows from FIG. 9 of the previously referenced U.S. provisional patent application, since P(2*2−1)=P(3)=5.

In the embodiment just described, binary edge labeled trees use binary numerals "0" and "1." However, the claimed subject matter is not limited in scope to binary edge labeled trees. For example, trees may employ any number of numeral combinations as labels, such as triplets, quadruplets, etc. Thus, using a quadruplet example, it is possible to construct trees, such as a zero-push of a particular tree, a one-push of that tree, a two-push of that tree, and a three-push of that tree. Thus, for such trees, edges may be labeled 0, 1, 2 or 3, etc.

The foregoing discussion has begun to characterize an algebra involving trees, in this particular embodiment, an algebra for ordered binary edge labeled trees or ordered BELTs. The foregoing discussion, therefore, defines a value zero, a zero node tree for this particular embodiment, value one, a one node tree for this particular embodiment, and a monadic operation, previously described as zero-push. For this particular embodiment, the push operation shall also be referred to as the successor operation. For this particular embodiment, this shall be denoted as S(x), where x refers to the tree to which the successor operation is applied. Of course, the claimed subject matter is not limited in scope to the successor operation, S(x), being limited to a zero-push. For example, alternatively, a "one-push" may be employed. For this embodiment, this is analogous, for example, to the convention that "0" represent "off" and "1" represent "on." Alternatively and equivalently, "1" may be employed to represent "off," and "0" may be employed to represent "on," without loss of generality.

Figure 8:
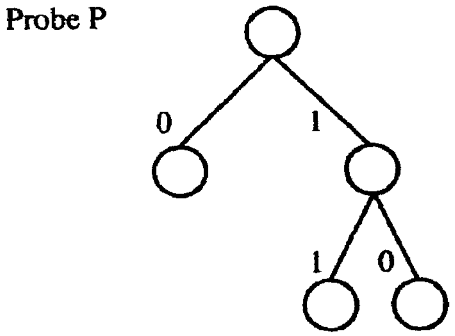
FIG. 8 is a schematic diagram illustrating an embodiment of an inversion operation and an embodiment of a merger operation applied to an embodiment of ordered binary edge labeled trees.
Figure 8:
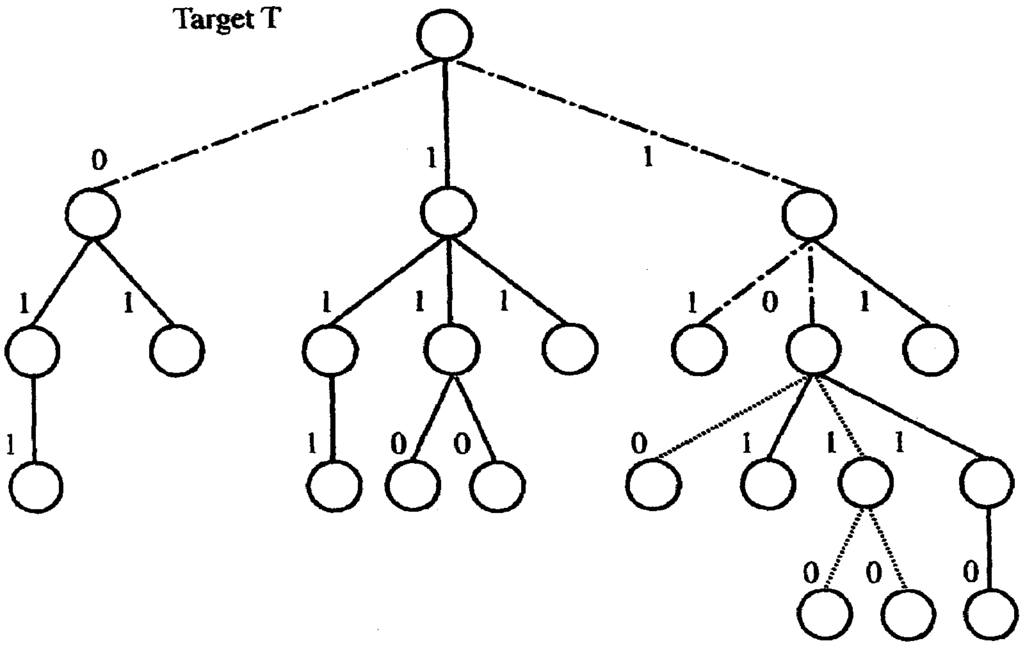

For this particular embodiment, two additional operations may be characterized, an "inversion" operation and a "merger" operation. For this particular embodiment, the inversion operation, when applied to a binary edge labeled tree, such as an ordered BELT, refers to replacing a "1" with a "0" and replacing a "0" with a "1". Likewise, the merger operation with respect to trees refers to merging two trees at their roots. These two operations are illustrated, for example, at embodiment 800 in FIG. 8, showing a probe tree P in embodiment 805 and a target tree T in embodiment 810.

As will now be appreciated, the inversion operation comprises a monadic operator while the merger operation comprises a binary operator. Likewise, the constants zero/one, referred to above, may be viewed as an operation having no argument or as a zero argument operator or operation. Thus, this operation, in effect, returns the same value whenever applied. Here, for this particular embodiment, the constant value zero, or zero argument operation that returns "0," is denoted as "c," the merger operator is denoted as "*", the inversion operation is denoted as "'", and the successor operator is denoted as previously described.

One additional aspect of the foregoing relationships that was omitted from this embodiment, but that might be included in alternate embodiments, is the addition of a second monadic operator, denoted here as "T(x)." This particular operator is omitted here without loss of generality at least in part because it may be defined in terms of operators previously described. More particularly, T(x)=S(x')', may be included in alternate embodiments. This approach, though not necessary from an implementation perspective, may add some symmetry and elegance to the above basis relationships. For example, it may be demonstrated that S(x)'=T(x') and S(x')=T(x)'. In some respects, this relationship is analogous to the relationship between the logical operations OR and AND in Boolean algebra, where −(A AND B)=−A OR −B, and −(A OR B)=−A AND −B. However, as indicated above, this may be omitted without loss of generality and, therefore, for implementation purposes, it may be easier to implement four operators rather than five.

Of course, as previously alluded to, for this particular embodiment, a useful distinction is also made between an ordered binary edge labeled tree and an unordered binary edge labeled tree. In this context, and as previously suggested, the notion of "ordered" refers to the property that the nodes attached to a particular node form an ordered set, the order corresponding to the order in which those nodes are displayed in the graph of the tree. However, it may likewise be observed that two ordered trees are resident in the same equivalence class of unordered BELTs if and only if the two trees are commutative translates of each other. In other the words, the two trees are equivalent and in the same unordered BELT equivalence class where the trees differ only in the order of the attached nodes.

Although the claimed subject matter is not limited in scope in this respect, one technique for implementing this approach may be to apply a table look up approach. Techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover such embodiments.

Embodiments of a method of performing tree matching has a variety of potentially useful applications. As described previously, trees provide a technique for structuring and/or depicting hierarchical data. Thus, for example, trees may be employed to represent language sentence structures, computer programs, algebraic formulae, molecular structures, family relationships and more. For example, one potential application of such a tree reduction technique is in the area of pattern matching. Thus, in pattern matching, substructures, in the form of a tree, for example, may be located within a larger structure, also in the form of a tree, referred to in this context as the target. This may be accomplished by comparing the structures; however, typically, such a comparison is complex, cumbersome, and/or time consuming. Although the claimed subject matter is not limited in scope to pattern matching or to any of the other potential applications described above, it may be instructive to work through at least one particular example of applying the previously described tree reduction approach to a pattern matching problem to demonstrate the power and/or versatility of this particular embodiment.

Within this particular context and for this particular embodiment, there are a number of potential pattern matching inquiries that may be made. Although these are simply examples and the claimed subject matter is not limited in scope to only these particular inquiries, one such inquiry, for example, may be whether a first tree, such as an ordered binary edge labeled tree, is equal to a second binary edge labeled tree? To phrase this differently, it may be useful to determine whether the trees match exactly. Likewise, another such query, or active verb, may be referred to in this context as a rooted partial sub tree (RPS) query or inquiry. This particular type of query or inquiry is demonstrated with reference to embodiment 1100 FIG. 11 in examples 1205 and 1210.

Figure 11:
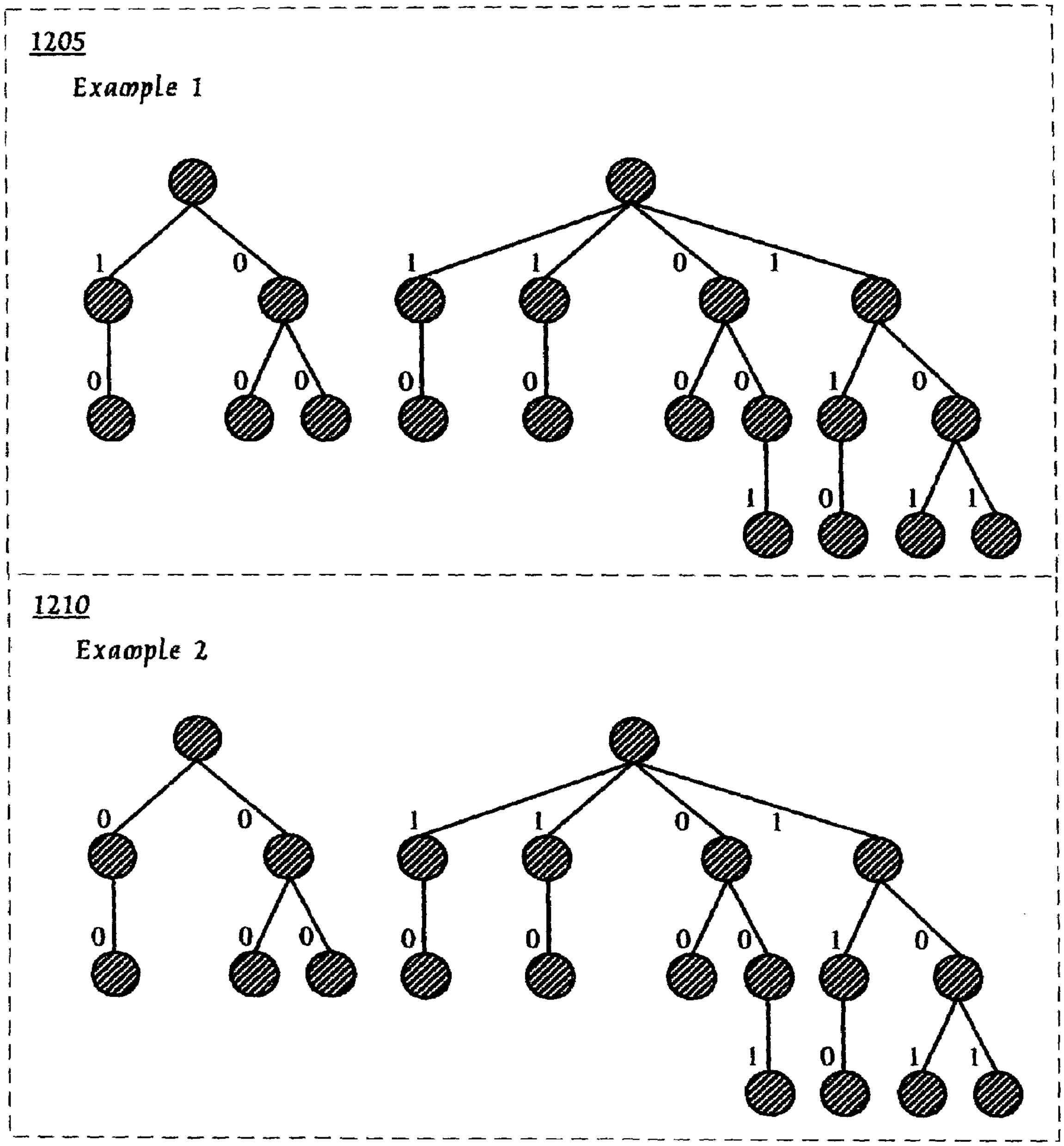
FIG. 11 is a schematic diagram illustrating an embodiment of a match and a non-match for an embodiment of an ordered binary edge labeled tree.

Thus, in Examples 1 and 2 of FIG. 11, the right-hand sides depict a binary edge labeled tree for the numeral 60543371. See, for example, the previously referenced U.S. provisional patent application 60/543,371. Here, in Example 1, the left-hand side of FIG. 11 provides a rooted partial subtree of the right-hand side. In this context, the term rooted refers to a comparison in which the roots of the left-hand side and the right-hand side are matched or compared. The notion of a partial subtree is to be distinguished from the notion of a full subtree. In this context, therefore, a rooted full subtree refers to the equality described above. Likewise, then, a rooted partial subtree refers to a match with another tree, but only to the extent of the nodes and edges present for the rooted partial subtree. Thus, the target may contain additional nodes, edges, and/or labels that are omitted from the rooted partial subtree. By way of contrast, Example 2 demonstrates on the left-hand side a tree that is not a rooted partial subtree of the right-hand side tree, although the left-hand side tree has the same arrangement of nodes and edges as a rooted partial subtree of the right-hand side. Thus, another type of match may occur where the arrangement of the nodes and edges match, but the labels do not match, as in Example 2.

One query or question to be posed, for the purposes of pattern matching, is whether the tree on the left-hand side, such as in example one, is a rooted partial subtree of the tree on the right-hand side. In addition to that, several other potential questions may be posed and potentially answered. For example, if the tree on the left-hand side is a rooted partial subtree of the tree on the right-hand side, it may be useful to know how many times this rooted partial subtree is present in the right-hand side tree. Likewise, assume that a rooted partial subtree is present more than once. It may be useful to have a mechanism to identify one of the several rooted partial subtrees to a machine, for example, for further processing.

It also may be desirable, in other circumstances, to determine whether there is a match between a rooted tree and a subtree that is not rooted. In this context this may be referred to, for example, as a "projected match". In this context, this refers to projecting one tree into another tree without matching corresponding roots and having the form and labels of the projected tree still be preserved in the tree in which it is projected.

Likewise, with reference to Example 2, in which the tree on the left-hand side does not match the tree on the right-hand side, an alternative query or question may relate to a measurement of the similarities and/or differences, as an embodiment of a measurement of the matching. For example, particular branches of the tree on the left-hand side may match with particular branches of the tree on the right-hand side, although overall, the entire tree on the left-hand side may not match to a subportion of the tree on the right-hand side, in this particular example. Thus, it may be appropriate, for example, to weight the matching in some form. Such an approach, for example, might be employed in data analysis, as simply one example. In one embodiment, for example, it may be desirable to identify a partial match that results in the maximum number of matching nodes and edges; likewise, in a different embodiment, it may be desirable to identify a partial match such that the match is closest to or most remote from the root. Again, any one of a number of other approaches is possible and such approaches included within the scope of the claimed subject matter. Thus, it may be desirable, assuming there is no identical match, to identify the closest match where "closest" or "most remote" is defined with respect to a particular weighted criterion designed to achieve a particular objective, such as the examples previously described.

Furthermore, to apply such queries such as, for example, determining whether a first tree is a rooted partial subtree of another tree, as indicated by the tree expression above, involves the application of known programming techniques. See, for example, Chapter 4, "Tree Isomorphism," of *Algorithms on Trees and Graphs*, by Gabriel Valiente, published by Springer, 2002. Such well-known and well-understood programming techniques will not be discussed here in any detail.

Much of the prior discussion was provided in the context of ordered binary edge labeled trees. However, a similar approach may be applied to unordered binary edge labeled trees, for example. In general, it is understood that performing such simplifications or reductions to unordered BELTs presents more of a processing challenge. See, for example, "Tree Matching Problems with Applications to Structured Text Databases," by Pekka Kilpelainen, Ph.D dissertation, Department of Computer Science, University of Helsinki, Finland, November, 1992. A potential reason may be that a greater number of possibilities are present combinatorially in those situations in which nodes may be unordered rather than ordered.

Figure 6:
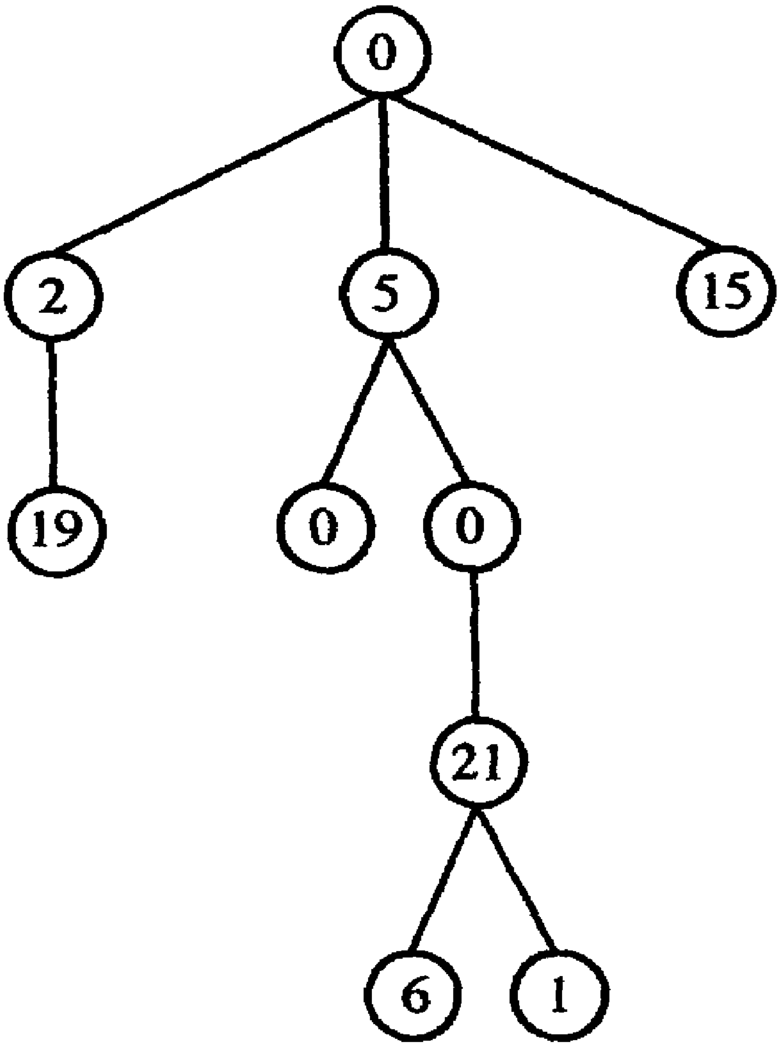
FIG. 6 is a schematic diagram of an embodiment of a binary node labeled tree.

Of course, the claimed subject matter is not limited to ordered or unordered binary edge labeled trees. For example, as described in previously cited U.S. provisional patent application No. 60/543,371, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero-value or a null value. This is illustrated, for example, in embodiment 600 of FIG. 6. Thus, rather than employing binary edge labeled trees, the previously described embodiments may alternatively be performed using binary node labeled trees. As one example embodiment, operations and/or manipulations may be employed using binary edge labeled trees and the resulting binary edge labeled tree may be converted to a binary node labeled tree. However, in another embodiment, operations and/or manipulations may be performed directly using binary node labeled trees where a different association embodiment is employed.

As previously alluded to, tree matching has a variety of potential and useful applications. It is noted that the claimed subject matter is not limited in scope to any particular set of applications. It is intended that the claimed subject matter include all currently known applications and all future developed applications. However, one aspect of tree matching relates to recognizing specific patterns. In particular, as previously alluded to, it may be desirable, depending at least in part on the circumstances of problem, to match a partial subtree, referred to here a query tree, with another tree, referred to here as a target tree. For this particular example or embodiment, the trees comprise unordered binary edge labeled trees, although, of course, the claimed subject matter is not limited in scope to these particular types of trees.

As an example, it may be desirable for a query tree, designated P, for example, to be matched against a target tree, designated T, for example. Thus, as previously suggested, it may be desirable to identify within T the correspondence of the node/label set of P within the node/label set of T that preserves the structure and labels of P. Likewise, as previously indicated, it is also possible that multiple occurrences of P may be found in T. Thus, the task, for this particular embodiment, is to identify and count the number of matches of P into T. Embodiment 900 of FIG. 9, for example, illustrates a query tree P with two partial subtree matches 910 and 915 in a target tree T from among query trees 905.

Without belaboring the discussion, as discussed in, U.S. provisional patent application No. 60/575,784, filed on May 28, 2004, by J. J. LeTourneau, titled, METHOD AND/OR SYSTEM FOR SIMPLIFYING TREE EXPRESSIONS, SUCH AS FOR PATTERN MATCHING, assigned to the assignee of the presently claimed subject matter, techniques may be applied to perform such tree matching operations. However, as the complexity of these trees increase, such as, for example, the tree depth and number of nodes, natural numerals that may be employed as part of the tree matching operations, such as those, for example, corresponding to the trees themselves, for example, U.S. provisional patent application No. 60/543,371, filed on Feb. 9, 2004, by J. J. LeTourneau, titled, MANIPULATING SETS OF HIERARCHIAL DATA, assigned to the assignee of the presently claimed subject matter, may become large. For example, experimental investigations have suggested that the number of bits in the natural numeral corresponding to a particular tree may approximately equal the number of nodes in the tree.

As is well-known, computing platforms, such as computers or other computing devices, typically represent natural numerals internally as a platform native integer of fixed size in a binary format, most commonly either 32 or 64 bits, although, of course, the claimed subject matter is not limited in scope in this respect. In this particular context, the term platform native integer of fixed size refers to the size of the data registers for the particular computing device. To take advantage of the computational power engineered to be delivered by such platforms, therefore, it may be desirable to perform operations in a manner so that numerals employed to perform the operations do not exceed a native platform sizes. Therefore, a mechanism to enable manipulation of trees whose corresponding natural numerals exceed a platform native size while employing numerals that do not exceed such sizes is desirable.

One potential approach might include developing a multi-precision software solution to store and manipulate (e.g., perform basic arithmetic operations, such as add and divide) for natural numerals larger than the native integer size. However, such an approach has a disadvantage in that the overhead associated with representing and manipulating large integers in software may be significant. Likewise, such multi-precision arithmetic operations, such as the multiply operation, for example, may potentially run orders of magnitude slower than the corresponding hardware operations specifically designed for platform native sized integers, for example.

Another potential approach may include subdividing the query and target trees. In such an approach they may be input to the tree matching problem so as to render the query and target trees expressible as numerals within the parameters of the particular platform. The results of the tree matching problem for such pieces may likewise be combined so that the correct number of matches for the particular query and target trees is obtained. The advantage of this approach is that the tree matching mechanism need not be modified beyond changing the type of natural numerals associated with trees. Furthermore, it has the potential advantage that the cost of operations associated with splitting up trees so that platform native arithmetic operations are performed may prove more beneficial than the costs associated with a multi-precision software approach.

In one particular embodiment, although the claimed subject matter is not limited in scope in this respect, it may be desirable to satisfy the following conditions:

1. Trees formed that are direct children of the root node of the target tree comprise a platform native integer numeral (hereinafter, referred to as a "Treenum").
2. Query trees comprise a platform native integer numeral.

It is desirable that these conditions be met so that, for this embodiment, the design of the processor to specifically handle platform native integer numerals is exploited at least in part. For this embodiment, for a given edge attached to root, the set of all nodes and edges below that edge is referred to as "child of root." A subtree of root comprises one or more children of root that, for this embodiment, satisfy condition 1 above.

Figure 10A:
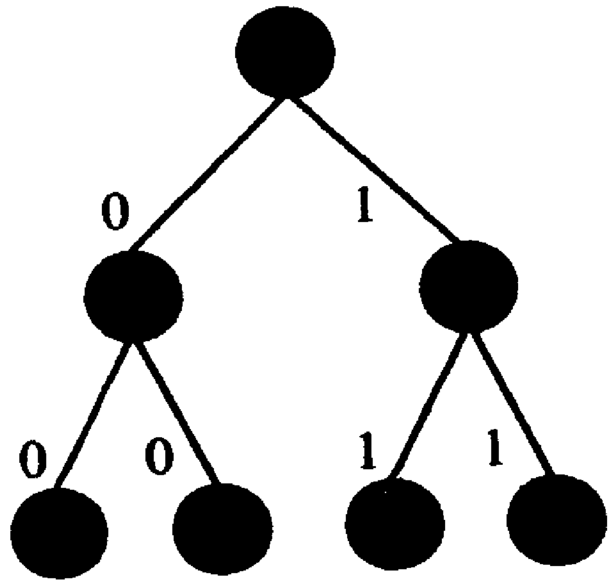
FIGS. 10*a* and 10*b* are schematic diagrams illustrating, respectively additional examples of potential embodiments of query and target trees.
Figure 10B:
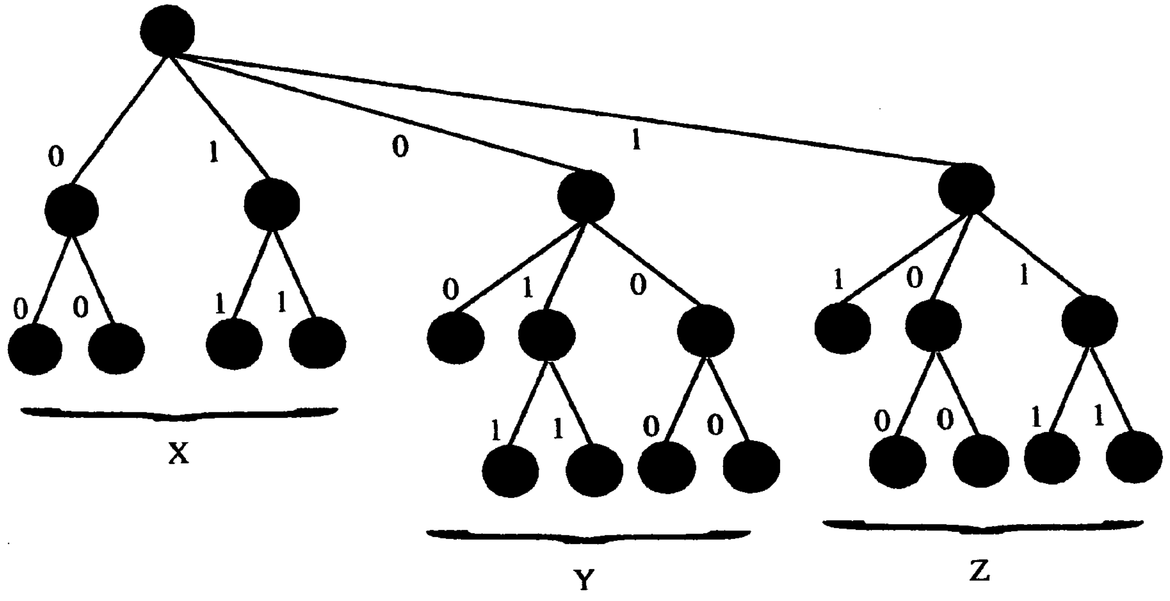

The target tree T, in this embodiment, is subdivided into a set of subtrees of root. However, for this embodiment, children of root are merged to form the subtrees so that the resulting tree, while being below a specific threshold, such as, for example, a threshold number of nodes, nonetheless, preferably is not subdivided significantly beyond that sufficient to place it below the threshold. For example, target tree, T, may be checked to determine the number of direct children of root that may be combined together while still complying with condition 1 above, for this embodiment. Experimental results indicated that the number of nodes in a BELT is at least roughly correlated to the number bits in the corresponding Treenum, for example. FIGS. 10*a* and 10*b* provide examples of query and target trees to be used to demonstrate applying this particular embodiment 1000.

Figure 12:
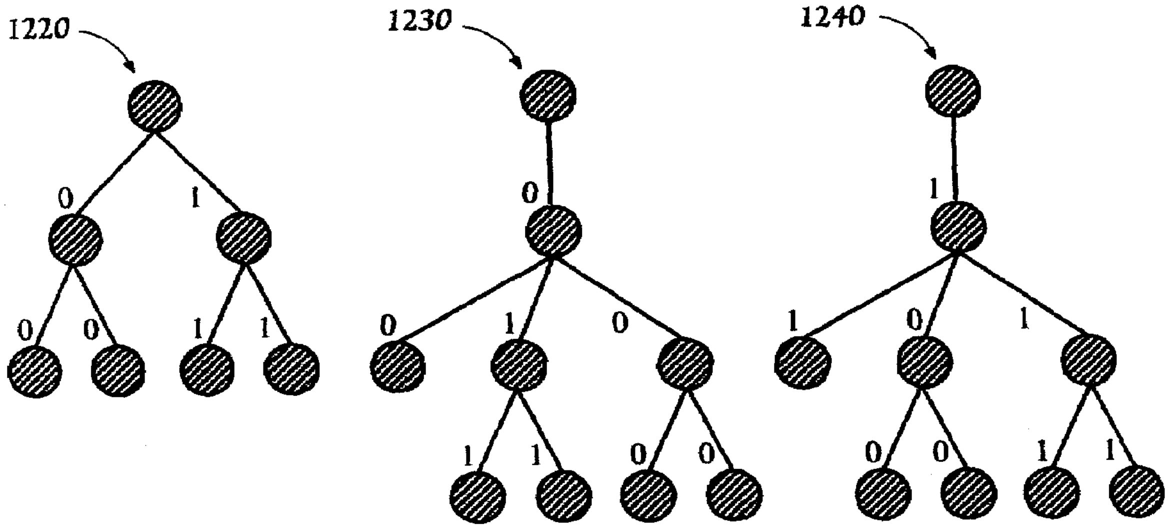
FIG. 12 is a schematic diagram illustrating, for the target tree example of FIG. 10*b*, potential subtree examples to be employed to accomplish matching for an embodiment of a method of performing tree matching.

In embodiment 1200 shown in FIG. 12, subtree 1220, also designated $T_X$, comprises two children of root while 1230 and 1240, respectively designated $T_Y$ and $T_Z$, comprise one child of root. The entire target tree, T, for this example, therefore, comprises the merger of the subtrees, as indicated by the following relationship:

$$T=T_X*T_Y*T_Z \quad [1]$$

Partial subtrees of the target subtrees may be enumerated in this particular embodiment. Several references outline methods to enumerate partial subtrees. See, for example, Chapter 4, "Tree Isomorphism," of *Algorithms on Trees and Graphs*, by Gabriel Valiente, published by Springer, 2002. Such well-known and well-understood programming techniques will not be discussed here in any detail.

For this particular embodiment, we define $T_J$ to be any single element in the set of all target subtrees (e.g., in this example, $T_X$, $T_Y$, $T_Z$). Each $T_J$, for this embodiment, will then have as its root, the root node of T, called $N_{ROOT}$ here. We further define a rooted partial subtree of any $T_J$ as a partial subtree which has as its root $N_{ROOT}$. Likewise, we define non-rooted partial subtrees as all other partial subtrees. Thus, the enumerated partial subtrees for each $T_J$ are divided into two categories: rooted and non rooted.

A distinction is made for this embodiment between rooted and non rooted partial subtrees at least in part because the non rooted matching case can be treated as a simple match of the whole query P against the list of non rooted subtrees for each $T_J$ in succession. The rooted matching problem is more complex at least in part because multiple children of the query root node may match in multiple different $T_J$. To address this, an enumeration is made of combinations of query children matches into the list of rooted partial subtrees for each target $T_J$ in order to arrive at the correct final match count.

Thus, for this embodiment, a match of the whole query tree against each nonrooted subtree list for $T_X$, $T_Y$, $T_Z$ is made. The sum of the non rooted match counts is stored. Examining FIGS. 10*a* and 10*b*, in the example above, provides 1 match each from $T_Y$, $T_Z$.

Following the non rooted matching, split the query tree into subtrees, one for each direct child of root. Children of query root are not combined as above, where target children of root are combined, since each target subtree may match against any single child of root in the query tree. For this embodiment, although the claimed subject matter is not limited in scope in this respect, it may be useful to construct and populate a grid of rooted subtree matches.

As described previously, all possible combinations of possible matches of rooted target partial subtrees against each child of root in the query tree is calculated. For a rooted match to occur, query children of root (row headings in table one below) are matched at least once against one or more of the rooted partial subtree lists maintained for each target subtree (column headings in table one below). The entry in the grid at a given row and column is the number of times that a single query tree child of root matches against a list of rooted partial subtrees for a single target subtree. In the example below, Table One, the entry values are taken from the example of FIGS. 10*a* and 10*b*.

TABLE ONE

| | $T_X$ | $T_Y$ | $T_Z$ |
|---|---|---|---|
| $P_A$ | 1 | 1 | 0 |
| $P_B$ | 1 | 0 | 1 |

For this embodiment, we also define $P_J$ as a member of the set of all query subtrees ($P_A$, $P_B$ in this example). For this embodiment, although the claimed subject matter is not limited in scope in this respect, the table may be stored in memory as a two dimensional array and may be traversed in column order, for example, recursively. A single combination may then comprise a single cell. For combinations, multiply all $P_J$ together to obtain the match count. Of course, zero values may be omitted from the calculation for convenience. From the example table above, here we have the following matches:

$$P_AT_X*P_BT_X=1 \text{ match}$$

$$P_AT_X*P_BT_Z=1 \text{ match}$$

$$P_AT_Y*P_BT_X=1 \text{ match}$$

$$P_AT_Y*P_BT_Z=1 \text{ match}$$

The total match count, for this embodiment, therefore, is the sum of rooted and nonrooted match counts.

In accordance with the claimed subject matter, therefore, any tree, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree and/or string, as described, for example in the previously referenced U.S. provisional patent application 60/543,371. For example, as described in the previously referenced U.S. provisional patent application, a node labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values. However, for convenience, without intending to limit the scope of the claimed subject matter in any way, here, operations and/or manipulations and the like have been described primarily in the context of BELTs.

Figure 7:
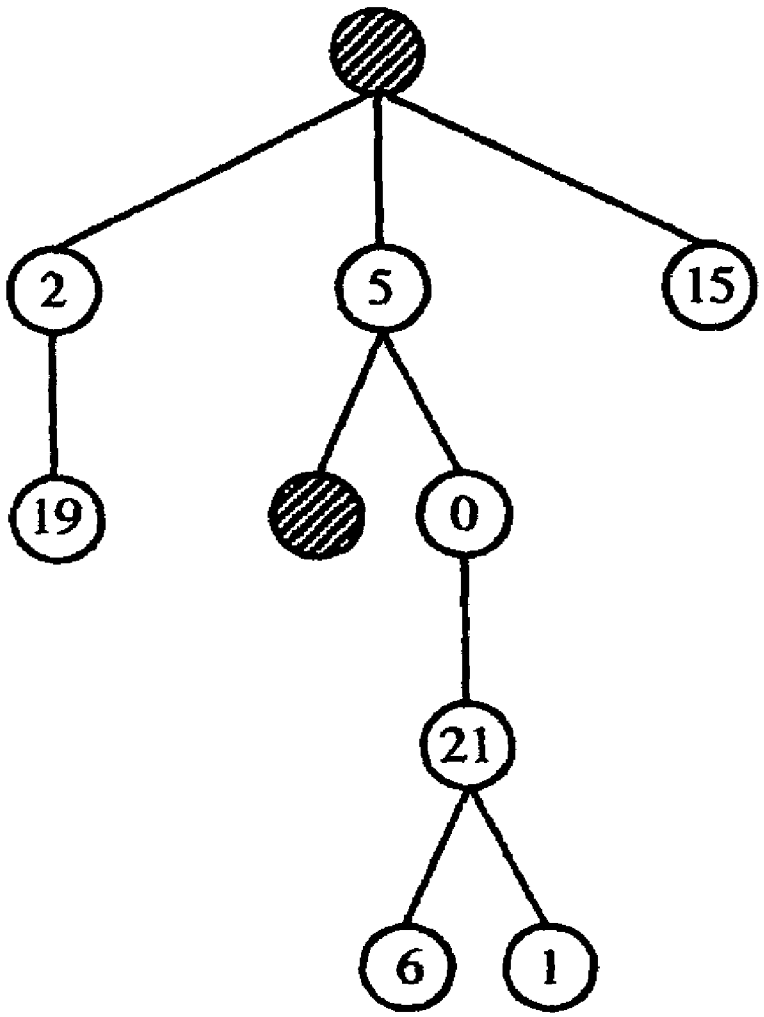
FIG. 7 is a schematic diagram illustrating another embodiment of a binary node labeled tree.

In another embodiment, however, a particular tree may include null types or, more particularly, some node values denoted by the empty set. This is illustrated, for example, by the tree in FIG. 7, although, of course, this is simply one example. Likewise, this example is an example of a binary node labeled tree with nulls, although, the claimed subject matter is not limited in scope in this respect. An advantage of employing null types includes the ability to address a broader array of hierarchical data sets. For example, without loss of generality and not intending to limit the scope of the claimed subject matter in any way, a null type permits representing in a database or a relational database, as two examples, situations where a particular attribute does not exist. As may be appreciated, this is different from a situation, for example, where a particular attribute may take on a numeral value of zero. Again, as described in the previously referenced U.S. provisional patent application No. 60/543,371, a tree with nulls, as described above, may be converted to a tree without nulls; however, the claimed subject matter is not limited in scope in this respect, of course. Thus, it may be desirable to be able to address both situations when representing, operating upon, manipulating and/or searching for patterns regarding hierarchical sets of data.

Likewise, in an alternative embodiment, a node labeled tree, for example, may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be converted to a binary edge labeled tree and/or binary node labeled tree, and, for another embodiment, a tree in which edges are labeled with numerals or numerical data, rather than binary data, may be converted to a binary edge labeled tree and/or binary node labeled tree. See previously referenced U.S. provisional patent application Ser. No. 60/543,371.

Furthermore, a tree in which both the nodes and the edges are labeled may be referred to in this context as a feature tree and may be converted to a binary edge labeled tree and/or binary node labeled tree. For example, without intending to limit the scope of the claimed subject matter, in one approach, a feature tree may be converted by converting any labeled node with its labeled outgoing edge to an ordered pair of labels for the particular node. Using the embodiment described, for example in the previously referenced U.S. provisional patent application, this tree may then be converted to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to binary edge labeled trees, such as by applying the embodiment of the previously referenced U.S. provisional patent application, for example. However, again, this is provided for purposes of explanation and illustration. The claimed subject matter is not limited in scope to employing the approach of the previously referenced provisional patent application.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of performing tree matching comprising:

executing instructions by a processor to:

subdivide a target tree and a query tree, said target tree being associated with a target tree numeral according to an association between trees and numerals, said query tree being associated with a query tree numeral according to said association;

associate at least one of said subdivided target trees with one or more electrical digital signals representative of one or more subdivided target tree numerals based, at least in part, on said target tree numeral;

associate at least one of said subdivided query trees with one or more electrical digital signals representative of one or more subdivided query tree numerals based, at least in part, on said query tree numeral; and apply said at least one of the subdivided query trees to said at least one of the subdivided target trees based, at least in part, on a comparison of one or more electrical digital signals representative of said one or more subdivided target tree numerals with one or more electrical digital signals representative of said one or more subdivided query tree numerals, wherein said target trees numeral is an integer, and wherein said one or more subdivided target tree numerals comprises integer factors of said target tree numeral such that dividing said target tree numeral by a subdivided target tree numeral provides an integer quotient.

2. The method of claim 1, and further comprising executing said instructions by said processor to subdivide the trees so that the size of the subdivisions does not exceed a specific threshold.

3. The method of claim 2, and further comprising executing said instructions by said processor to subdivide the trees so that the subdivisions are the largest subdivisions of the trees without exceeding said specific threshold.

4. The method of claim 2, wherein said specific threshold comprises a particular number of nodes.

5. The method of claim 2, and wherein said specific threshold comprises a platform native integer of fixed size for said processor.

6. The method of claim 5, wherein said subdivisions are associated with natural numerals and said specific threshold comprises an electrical digital signal representative of a natural numeral.

7. The method of claim 1, and further comprising: executing said instructions by said processor to apply one or more electrical digital signals representative of said query tree to one or more electrical digital signals representative of said subdivided target trees.

8. The method of claim 1, wherein said trees comprise binary edge labeled trees (BELTs).

9. The method of claim 1, wherein said query tree comprises a partial subtree.

10. The method of claim 9, wherein said partial subtree comprises a rooted partial subtree.

11. The method of claim 9, wherein said partial subtree comprises a non-rooted partial subtree.

12. The method of claim 1, wherein said query tree comprises a full subtree.

13. The method of claim 1, wherein said query tree numeral is an integer, and wherein said one or more subdivided query tree numerals comprise an integer factor of said query tree numeral such that dividing said query tree numeral by a subdivided query tree numeral provides an integer quotient.

14. The method of claim 5, wherein said target tree is subdivided such that said one or more subdivided target tree numerals do not exceed said native integer of fixed size for said processor.

15. The method of claim 5, wherein said query tree is subdivided such that said one or more subdivided query tree numerals subdivided query tree numerals do not exceed said native integer of fixed size for said processor.

16. An article comprising:

a storage medium having stored thereon instructions that, in response to being executed by a processor, direct said processor to:

subdivide a target tree and a query tree, said target tree being associated with a target tree numeral according to an association between trees and numerals, said query tree being associated with a query tree numeral according to said association;

associating at least one of said subdivided target trees with one or more electrical digital signals representative of one or more subdivided target tree numerals based, at least in part, on said target tree numeral;

associating at least one of said subdivided query trees with one or more electrical digital signals representative of one or more subdivided query tree numerals based, at least in part, on said query tree numeral; and applying the subdivided query tree to the subdivided target tree based, at least in part, on a comparison of said one or more electrical digital signals representative of said one or more subdivided target tree numerals with one or more electrical digital signals representative of said one or more subdivided query tree numerals, wherein said target tree numeral is an integer, and wherein said one or more subdivided target tree numerals comprises integer factors of said target tree numeral such that dividing said target tree numeral by a subdivided target tree numeral provides an integer quotient.

17. The article of claim 16, wherein said instructions, in response to being executed by said processor, further direct said processor to subdivide said target tree and said query tree by subdividing the trees so that the size of the subdivisions does not exceed a specific threshold.

18. The article of claim 17, wherein said instructions, in response to being executed by said processor, further direct said processor to subdivide said target tree and said query tree by subdividing the trees so that the subdivisions are the largest subdivisions of the trees without exceeding said specific threshold.

19. The article of claim 17, wherein said specific threshold comprises a particular number of nodes.

20. The article of claim 17, wherein said specific threshold comprises a platform native integer of fixed size for said processor.

21. The article of claim 17, wherein said subdivisions are associated with natural numerals and said specific threshold comprising a natural numeral.

22. The article of claim 16, wherein said instructions, in response to being executed by said processor, are further adapted to direct said processor to apply said query tree to said subdivided target trees.

23. The article of claim 16, wherein comprise binary edge labeled trees (BELTs).

24. The article of claim 16, wherein, said query tree comprises a partial subtree.

25. The article of claim 24, wherein said partial subtree comprises a rooted partial subtree.

26. The article of claim 24, wherein said partial subtree comprise a non-rooted partial subtree.

27. The article of claim 16, wherein said query tree comprises a full subtree.

28. The article of claim 16, wherein said query tree numeral is an integer, and wherein said one or more subdivided query tree numerals comprise an integer factor of said query tree numeral such that dividing said query tree numeral by a subdivided query tree numeral provides an integer quotient.

29. The article of claim 20, wherein said target tree is subdivided such that said one or more subdivided target tree numerals do not exceed said native integer of fixed size for said processor.

30. The article of claim 20, wherein said query tree is subdivided such that said one or more subdivided query tree numerals subdivided query tree numerals do not exceed said native integer of fixed size for said processor.

31. An apparatus comprising:

means, comprising a processor, for subdividing a target tree and a query tree, said target tree being associated with a target tree numeral according to an association between trees and numerals, said query tree being associated with a query tree numeral according to said association;

means, comprising said processor, for associating at least one of said subdivided target trees with one or more subdivided target tree numerals based, at least in part, on said target tree numeral;

means, comprising said processor, for associating at least one of said subdivided query trees with one or more subdivided query tree numerals based, at least in part, on said query tree numeral; and means, comprising said processor, for applying the subdivided query tree to the subdivided target tree based, at least in part, on a comparison of said one or more subdivided target tree numerals with said one or more subdivided query tree numerals.

wherein said target tree numeral is an integer, and wherein said one or more subdivided target tree numerals comprises integer factors of said target tree numeral such that dividing said target tree numeral by a subdivided target tree numeral provides an integer guotient.

32. The apparatus of claim 31, wherein said means for subdividing comprises means for subdividing the trees so that the size of the subdivisions does not exceed a specific threshold.

33. The apparatus of claim 32, wherein said means for subdividing the trees so that the size of the subdivisions do not exceed a specific threshold comprising means for subdividing the trees so that the subdivisions are the largest subdivisions of the trees without exceeding said specific threshold.

34. The apparatus of claim 32, wherein said means for subdividing comprising means for subdividing the trees so that the size of the subdivisions do not exceed a specific threshold, said specific threshold comprising a particular number of nodes.

35. The apparatus of claim 32, wherein said specific threshold comprises a platform native integer of fixed size for said processor.

36. The apparatus of claim 32, wherein said means for subdividing comprising means for subdividing the trees so that the size of the subdivisions do not exceed a specific threshold, said specific threshold comprising a natural numeral.

37. The apparatus of claim 31, and further comprising means for applying said query tree to said subdivided target trees.

38. The apparatus of claim 31, wherein said trees comprise binary edge labeled trees (BELTs).

39. The apparatus of claim 31, wherein said query tree comprises a partial subtree.

40. The apparatus of claim 39, wherein said partial subtree comprises a rooted partial subtree.

41. The apparatus of claim 39, wherein said partial subtree comprises a non-rooted partial subtree.

42. The apparatus of claim 31, wherein said query tree comprises a full subtree.

43. The apparatus of claim 31, wherein said query tree numeral is an integer, and wherein said one or more subdivided query tree numerals comprise an integer factor of said query tree numeral such that dividing said query tree numeral by a subdivided query tree numeral provides an integer quotient.

44. The apparatus of claim 35, wherein said target tree is subdivided such that said one or more subdivided target tree numerals do not exceed said native integer of fixed size for said processor.

45. The apparatus of claim 35, wherein said query tree is subdivided such that said one or more subdivided query tree numerals subdivided query tree numerals do not exceed said native integer of fixed size for said processor.

46. An apparatus comprising:

a computing platform, said computing platform comprising one or more processors programmed with instructions to:

subdivide a target tree and a query tree, said target tree being associated with a target tree numeral according to an association between trees and numerals, said query tree being associated with a query tree numeral according to said association;

associate at least one of said subdivided target trees with one or more electrical digital signals representative of one or more subdivided target tree numerals based, at least in part, on said target tree numeral;

associate at least one of said subdivided query trees with one or more electrical digital signals representative of one or more subdivided query tree numerals based, at least in part, on said query tree numeral; and apply the subdivided query tree to the subdivided target tree based, at least in part, on a comparison of said one or more signals representative of said one or more subdivided target tree numerals with said one or more signals representative of said one or more subdivided query tree numerals, wherein said target tree numeral is an integer, and wherein said one or more subdivided target tree numerals comprises integer factors of said target tree numeral such that dividing said target tree numeral by a subdivided target tree numeral provides an integer guotient.

47. The apparatus of claim 46, wherein said one or more processors are further programmed with instructions to subdivide the trees so that the size of the subdivisions does not exceed a specific threshold.

48. The apparatus of claim 47, wherein said one or more processors are further programmed with instructions to subdivide the trees so that the subdivisions are the largest subdivisions of the trees without exceeding said specific threshold.

49. The apparatus of claim 47, wherein said specific threshold comprises a particular number of nodes.

50. The apparatus of claim 47, wherein said specific threshold comprises a platform native integer of fixed size for said computing platform.

51. The apparatus of claim 47, wherein said specific threshold comprises a natural numeral.

52. The apparatus of claim 46, wherein said one or more processors are further programmed with instructions to apply said query tree to said subdivided target trees.

53. The apparatus of claim 46, wherein said trees comprise binary edge labeled trees (BELTs).

54. The apparatus of claim 46, wherein said query tree comprises a partial subtree.

55. The apparatus of claim 54, wherein said partial subtree comprises a rooted partial subtree.

56. The apparatus of claim 54, wherein said partial subtree comprises a non-rooted partial subtree.

57. The apparatus of claim 46, wherein said query tree comprises a full subtree.

58. The apparatus of claim 46, wherein said query tree numeral is an integer, and wherein said one or more subdivided query tree numerals comprise an integer factor of said query tree numeral such that dividing said query tree numeral by a subdivided query tree numeral provides an integer quotient.

59. The apparatus of claim 50, wherein said target tree is subdivided such that said one or more subdivided target tree numerals do not exceed said native integer of fixed size for said processor.

60. The apparatus of claim 50, wherein said query tree is subdivided such that said one or more subdivided query tree numerals subdivided query tree numerals do not exceed said native integer of fixed size for said processor.

* * * * *